July 30, 1946. G. W. CRISE Re 22,774
ROTARY HEAT MOTOR
Original Filed Aug. 2, 1940
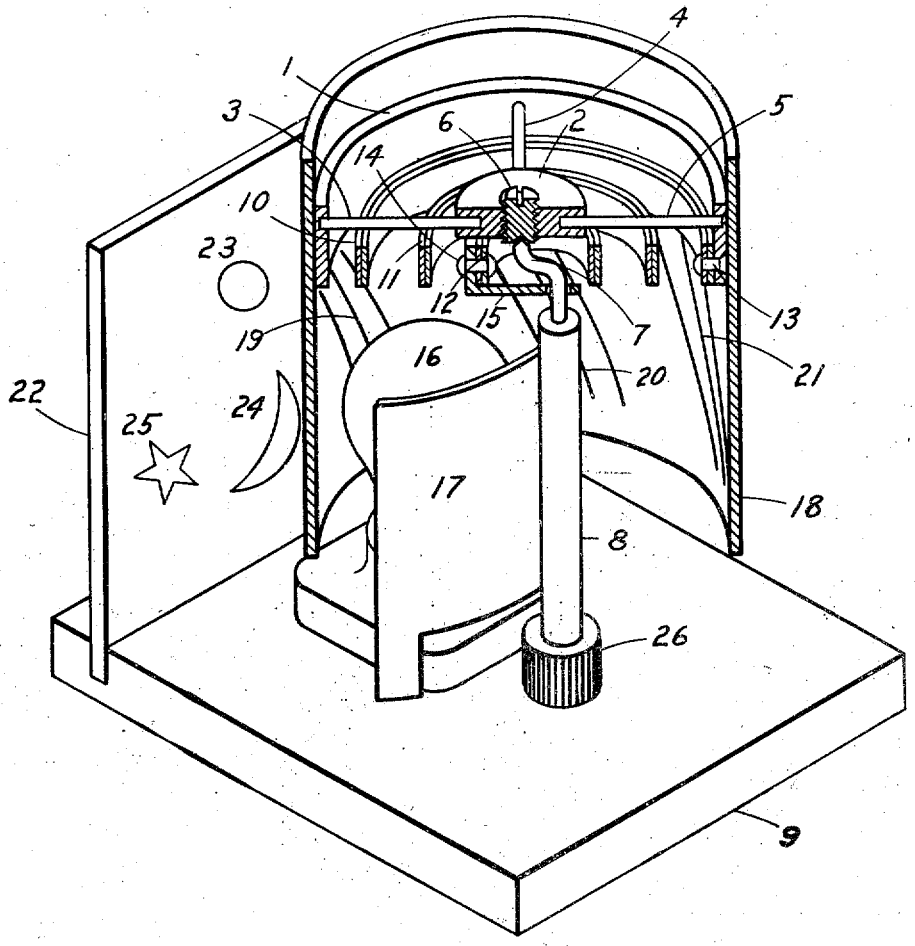
George W. Crise
INVENTOR Reissued July 30, 1946

Re. 22,774

UNITED STATES PATENT OFFICE 22,774

ROTARY HEAT MOTOR

George W. Crise, Columbus, Ohio

Original No. 2,337,084, dated December 21, 1943, Serial No. 349,791, August 2, 1940. Application for reissue October 21, 1944, Serial No. 559,717

3 Claims. (Cl. 60—23)

The principal object of my invention is to provide a simple and inexpensive slow speed motor for the operation of animated signs directly from the heat of the lamp used in lighting the sign.

Additional and important applications being the operation of displays, timers, switches, toys, water circulators and all other small power applications where it is desired to obtain slow speed motion from a heat source.

Another object of my invention is to provide a dependable power source by eliminating such trouble producing parts as windings, high speed bearings and gears, and at the same time produce a silent motor whose torque increases as the motor is slowed down by any form of overload.

A further object of my invention is to produce a heat motor whose commutation, or timing, is accomplished by carrying the propelling element through the heating zone by mounting it on a single rotating member which revolves through two different temperature zones.

A simple embodiment of my invention uses a strip of thermostatic bimetal spirally coiled within a pivoted ring, the outer end of the bimetal being attached to the ring and the inner end by a bearing to the offset throw of a crank shaft, on the central end of which shaft the ring rotates. A light bulb supplies heat to one side of the bimetal coil causing it to distort throwing tension on the crank at right angles to the heat source, resulting in rotation of the ring and bimetal spiral which carries other sections of the bimetal into the heated zone with recurring action and consequent continuous rotation.

The operation of my motor will be more clearly understood by referring to the accompanying drawing in which the single figure is a sectional perspective view of my improved heat motor and in which 1 is a pivoted frame ring in section, 2 a pivot hub member, shown in section, joined by the spokes 3, 4, and 5 to ring 1, and carrying hardened cup point set screw 6 to act as a pivot bearing.

7 is a crank shaft whose central throw is pointed to carry bearing 6, and is supported by post 8 which in turn is manually rotatable in base 9. 10, 11 and 12 are consecutive coils of a thin bimetal spiral, shown in section, which is fastened to frame ring 1 by rivet 13, and by rivet 14 to a crank bearing 15. 16 is a source of heat and light, 17 is a combination reflector and heat baffle.

18 is a transparent rotor in the form of a cylinder, shown in section, on which 19, 20 and 21 are irregular light varying and intercepting streaks.

22 is a screen on which are translucent designs 23, 24 and 25 so placed as to be in the path of light passing through cylinder 18. 26 is a knurled sleeve for rotating the crank 7 and post 8 in base 9 to control the motor speed and direction.

From the foregoing it will be observed that the reflector baffle 17 divides the space within the cylinder 18 into two zones, one of which is occupied by the lamp 16, which when lighted causes a draft of hot air to rise through the section of bimetal spiral 10, 11 and 12 directly over it.

It will also be obvious that this rising hot air will induce a draft of cool air through the opposite side of the same bimetal spiral 10, 11 and 12, by the well-known suction action of warm air currents in chimneys.

Now it is well known in the art that if a bimetal spiral be uniformly heated or cooled, it will tend to wind or unwind concentrically because of the uniform bending action of all the bimetal, but if one side of the spiral be heated more than the other, the bending tendency will be greatest in the section of greatest temperature change, which will result in the spiral becoming eccentric.

Since the bimetal spiral 10, 11 and 12 is secured to ring 1 by rivet 13, the only way it can become eccentric is by moving the central turn of bimetal at 12, and since 12 is attached to crank 7 by crank bearing 15, it will be obvious that pressure will be exerted on crank 7 at approximate right angles to the heated section of bimetal 10, 11 and 12, which is above lamp 16.

Since this pressure is out of line with the axis of rotation of ring 1, which is free to rotate on the central point of crank shaft 7 at cup bearing 6, the entire motor and cylinder assembly will revolve, carrying the already heated bimetal section away from lamp 16 and into the cool draft rising on the opposite side of heat baffle 17.

In this way a continually recurring distortion of the bimetal at right angles to the heating zone will hold pressure on crank 7 producing continuous rotation of the motor.

It will also be observed that by rotating post 8 by knurled sleeve 26, the position of motor bearing 6 with respect to crank 7 and heat source 16 can be adjusted to any relation, thereby causing the bimetal distortion which is always at approximate right angles to the heating zone, to produce rotation in either direction, or by adjusting it to a neutral position, motor may be stopped. By adjusting the crank to various angles between the neutral and maximum torque positions, various speeds may be secured in either direction.

Because the light from source 16 which falls on the decorations 23, 24 and 25 is intercepted and varied by the revolving streaks 19, 20 and 21, as they rotate with cylinder 18 at speeds and direction selectable by turning sleeve 26, a variety of animated effects are available on screen 22.

Having described a simple form of my invention, it will be apparent that the rotary principle of self-commutation may be applied with any form of heat responsive distorting member by revolving it through zones of different temperature.

I claim:

1. A heat motor comprising a spirally wound thermally distortable bimetallic element, a supporting means having an eccentric part on which one end of said element is rotatably mounted, said element when considered in its entirety being in substantially concentric relation to said part when under uniform temperatures, and means for so heating a localized area of said element to a higher temperature than the remaining area thereof that said areas respectively will be relatively heated and cooled to produce distortion in said bimetallic element, thereby causing such bending thereof as to continually maintain the same during such heating in substantially eccentric relation when considered in its entirety to the said part for producing continuous unidirectional rotation of said element and part.

2. A heat motor comprising a spiral thermally distortable bimetallic coil, a supporting means, an element rotatable on said supporting means and to which one end of said coil is connected, a second element rotatable on said supporting means and to which the other end of said coil is connected, the axis of rotation of said second element being eccentric with respect to the axis of rotation of said first-named element, and means for so producing a temperature differential in different regions of said bimetallic coil as to cause distortion thereof through alternate heating and cooling to produce rotative torque effort.

3. A heat motor comprising a spiral thermally distortable bimetallic coil, a rotor to which one end of said coil is secured, means mounting the rotor for rotation on an axis eccentric with respect to the axis about which the other end of the coil winds, and means for so producing a temperature differential in different regions of said coil as to cause distortion thereof through the alternate heating and cooling to produce rotation.

GEORGE W. CRISE.